G. BAUMANN.
DRIVING CHAIN.
APPLICATION FILED AUG. 17, 1917.
1,269,997.
Patented June 18, 1918.
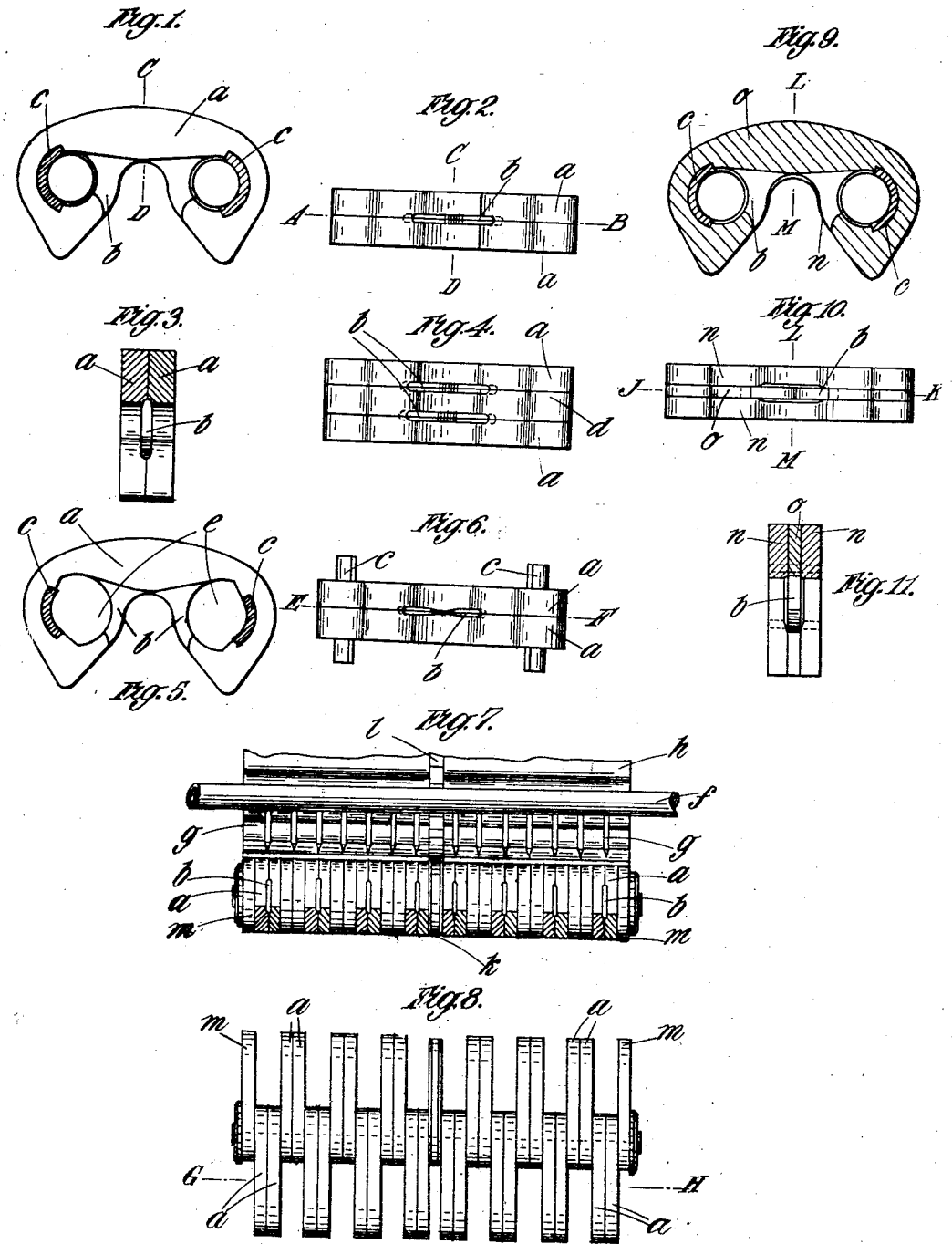
GOTTFRIED BAUMANN
INVENTOR.
by Lawrence Langner
Attorney

UNITED STATES PATENT OFFICE.

GOTTFRIED BAUMANN, OF MANCHESTER, ENGLAND, ASSIGNOR TO HANS RENOLD LIMITED, OF MANCHESTER, ENGLAND.

DRIVING-CHAIN.

1,269,997.  Specification of Letters Patent.  Patented June 18, 1918.

Application filed August 17, 1917. Serial No. 186,718.

*To all whom it may concern:*

Be it known that I, GOTTFRIED BAUMANN, a subject of the King of Great Britain, and residing at Burnage Works, Didsbury, Manchester, in the county of Lancaster, England, have invented certain new and useful Improvements Relating to Driving-Chains, of which the following is a specification.

This invention relates to driving chains of the silent type. It is the object of the invention to form the link plates and the assembled link units of the chain in such a manner as to facilitate effective lubrication of the bearing surfaces. A further object is to provide for such lubrication without increasing the width of chain required for transmitting a given load, and to do this by the use of link plates which can be punched out at small expense to the required shape.

The invention is illustrated in the accompanying drawings wherein:—

Figure 1 is a side elevation of a link plate as seen from its inner face; it may be considered to be a section on the line A—B of Fig. 2;

Fig. 2 is an underneath plan view of a block unit made up of two such links secured face to face;

Fig. 3 shows a cross section of such a block unit taken on the line C—D of Fig. 1 or Fig. 2;

Fig. 4 shows an underneath plan view of a block unit made up of three link plates;

Fig. 5 is a view similar to Fig. 1 but showing a link plate with the holes therein of different form; it may be considered to be a section on the line E—F of Fig. 6;

Fig. 6 is an underneath plan view showing the link plate of Fig. 5 made up in a block unit with projecting segmental liners;

Fig. 7 shows a section through the lower run of a multiple strand chain made up of block units such as are shown in Fig. 2, and illustrating one method of lubricating the same;

Fig. 8 is a view showing one arrangement of the block units and links in a chain. It may be assumed that the chain in Fig. 7 is in section on the line G—H of Fig. 8;

Fig. 9 shows another form of block unit in section on the line J—K of Fig. 10;

Fig. 10 shows an underneath plan view of this block unit, and

Fig. 11 shows a cross section thereof on the line L—M of Figs. 9 and 10.

Referring first to Figs. 1 to 3, $a$ is a link which is punched out in the usual way but has an indentation formed in it at $b$ in the arch portion, forming a slot which leads from the arch inwardly to the stud holes. In the example shown two such links $a$ are connected together with their indentations $b$ facing one another to form an oil groove as seen in Fig. 2, the segmental bushes inserted at $c$ in Fig. 1 serving to connect the links together in pairs. These segmental bushes provide the bearing surfaces which work on the studs when the chain is made up in the usual manner.

If each block unit is to consist of more than two links, the outer links will have indented slots $b$ on one face as before, while the intermediate link or links may have indented slots on both faces, as seen in plan for the intermediate link plate $d$ in Fig. 4.

In the construction shown in Figs. 1 to 4 the segmental bushes $c$ do not project beyond the link faces when block units are made up, but if the stud holes are modified in shape in the known way, it is possible to accommodate laterally extending liners, those of one link overlapping those of the next link in the adjacent pitch. Fig. 5 shows a link of this type formed with spaces as at $e$ in which the laterally extending liners of the links of the next pitch will work. The extended liners $c$ are seen in Fig. 6. For most purposes however the construction and arrangement of Figs. 1 to 3 will be preferable as the links can be made stronger, larger studs can be used, and the bearing surface is ample.

Chains with links of this type will generally be used for transmitting comparatively heavy drives in workshops and the like, and it may not be convenient to arrange them to run in an oil bath. In order to apply the lubricant where it is most useful, it is desirable then to conduct the lubrication in some convenient way so that it will fall in the lower run of the chain in the lines where the oil grooves $b$ lie. This is illustrated in Fig. 7 in which a pipe $f$ carrying oil has a number of spouts $g$ extending from it and allowing oil to drop therefrom substantially in line with the oil grooves $b$ of the successive pitches of the chain. The oil which drops on any part of a link or block unit between the points of its teeth, tends to flow down to the arch or gap, and so to find its way with certainty to the grooves b and the bearing surfaces. A portion of the gear wheel h is seen in Fig. 7 and the chain is supposed to be running off this gear wheel. The links in Fig. 7 are supposed to be arranged as in Fig. 8, central guide links k being used which engage in a central groove at l, Fig. 7, in the chain wheel h. In order to balance the load on the studs as equally as possible, this construction involves the use of a single link m instead of a block unit at each end of each alternate pitch. There are many other obvious arrangements of links however which do not involve this. It will be evident that links formed as above described with oil grooves can be used in a great many different combinations which it will not be necessary to describe here.

Figs. 9 to 11 show a construction in which two plain link plates n, without any oil grooves, are combined with a single narrow plate o placed between them, the plate o being cut away completely in the part where the oil groove b comes. The three plates are held together by the segmental bushes c as before, and the result is a block unit equivalent to that of Figs. 1 to 3, but with the possible advantage that the links n run no risk of being weakened (as the links a of Figs. 1 to 3 might be) by the indenting or cutting of the oil groove in them.

If the oil space b is formed in the link plate by indentation, it will generally be formed after the link is blanked, the blank being shaved if necessary afterward in order to bring it to the correct shape in case the indenting has caused any distortion. The stud holes will also be formed or finished afterward for a similar reason. The oil grooves might be formed by machining with a small milling cutter or in any other way, but the method of indenting is preferred and is the cheapest to employ in practice. The inserted segmental bushes c will preferably be hardened, and in the forms shown in Fig. 1 and in Fig. 9 it will be seen that the segmental bushes extend over a wide angle of approximately 120° while the stud can be large in diameter, whereas when an extended liner is used as in Fig. 5 it cannot embrace the stud over such a wide angle, and the stud must be smaller in practice to allow for the overlapping of the liners in the links.

Although chains have been described made up with the links generally in block units, yet single indented links can be used as illustrated for instance at m Fig. 8, and chains can be made up in a great variety of ways using such links singly or in block units as will be well understood. The invention is not limited therefore to any particular method of combining the links or arranging them in a chain, or to any particular form of bearing surfaces at the stud holes.

Having thus described my invention what I claim as new and desire to secure by Letters Patent is:—

1. A link unit for driving chains of the silent type, comprising a plurality of link plates formed with slotted stud holes and with gear teeth, and a pair of bushes connecting said link plates through the slots of the stud holes and providing bearing surfaces for the link unit, said link plates being formed in such manner that when placed close together on the bushes a slot is left between them leading from the link arch into the stud holes.

2. A link unit for driving chains of the silent type, comprising a plurality of link plates each formed with gear teeth and with slotted stud holes, and with an indented oil groove at each face of a link plate which comes opposite to the face of another link plate in the completed link unit, such indented oil grooves extending from the link arch to the two stud holes, and a pair of segmental bushes connecting said link plates through the slots of the stud holes, whereby a link unit is formed with the indented oil grooves facing one another therein.

3. A link unit for driving chains of the silent type, comprising a pair of link plates with gear teeth and with stud holes slotted at their outer faces, and a pair of segmental bushes connecting said link plates together through the slots of the stud holes, each link plate having an indentation therein on one face extending from the link arch to the two stud holes, the link plates being assembled on the segmental bushes with such indentations facing one another, whereby an oil passage is formed leading from the link arch to both of its stud holes.

4. In a driving chain, the combination of a plurality of gear link units, studs pivotally connecting said link units through stud holes therein, and means for securing said studs in position, each gear link unit consisting of a plurality of gear link plates and a pair of bushes connecting said link plates, the link plates being formed in such manner as to leave an oil passage in the link unit between the assembled link plates thereof, and leading from the arch of the link unit to the holes thereof through which said studs are passed.

5. As an article of manufacture, a gear link plate for use in a chain, and consisting of a metal blank formed with gear teeth, with stud holes therein, and with an indentation on one lateral face of the link plate constituting a depression on that face extending across it from one stud hole to the other and from each stud hole into the link arch.

6. As an article of manufacture, a gear link plate for use in a chain, and consisting of a metal blank formed with gear teeth, with stud holes and slots therein adapted for the reception of segmental bushes, and with an indentation on one lateral face of the link plate constituting a depression on that face extending across it from one stud hole to the other and from each stud hole into the link arch.

GOTTFRIED BAUMANN.

Copies of this patent may be obtained for five cents each, by addressing the "Commissioner of Patents, Washington, D. C."